(12) United States Patent
Chen

(10) Patent No.: US 6,837,579 B1
(45) Date of Patent: Jan. 4, 2005

(54) GLASSES HAVING ANGLE ADJUSTABLE FUNCTION

(76) Inventor: Chun-Nan Chen, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/746,777

(22) Filed: Dec. 26, 2003

(51) Int. Cl.⁷ .................................................. G02C 5/14

(52) U.S. Cl. ....................................... 351/120; 351/119
(58) Field of Search ................................ 351/120, 111, 351/116, 118, 119, 41, 110

(56) References Cited

U.S. PATENT DOCUMENTS 6,454,406 B1 * 9/2002 Guo ............................ 351/120

* cited by examiner

Primary Examiner—Hung Xuan Dang

(57) ABSTRACT

A pair of glasses include a rim, two pivot blocks, two connecting blocks, and two temples. Thus, the rim, the pivot blocks, the connecting blocks and the temples are assembled easily and conveniently to form the glasses, thereby facilitating the maker and user assembling the glasses, and thereby enhancing the working efficiency. In addition, the rim, the pivot blocks, the connecting blocks and the temples are worked easily, thereby decreasing costs of fabrication.

8 Claims, 4 Drawing Sheets

US 6,837,579 B1

GLASSES HAVING ANGLE ADJUSTABLE FUNCTION

BACKGROUND OF THE INVENTION

1. Field of the Invention

The present invention relates to a pair of glasses, and more particularly to a pair of glasses having an angle adjustable function.

2. Description of the Related Art

A conventional pair of glasses in accordance with the prior art shown in FIGS. 6 and 7 comprises a rim 100, two connecting seats 200, two locking blocks 400, two connecting blocks 302, and two temples 300. The rim 100 has two ends each formed with a hole 101. Each of the two connecting seats 200 is mounted on the rim 100 and has a first end formed with a lug 205 secured in the hole 101 of the rim 100, a mediate portion formed with an opening, 201 having a side formed with a plurality of locking grooves 202 and a second, end formed with a through hole 203. Each of the two locking blocks 400 is pivotally mounted on a respective one of the connecting seats 200 and has a first end formed with a stub 402 locked in one of the locking grooves 202, a mediate portion formed with a pivot hole 403 and a second end formed with an ear 401. A pin 204 is extended through the through hole 203 and the pivot hole 403, so that each of the two locking blocks 400 is pivoted relative to the respective connecting seat 200. Each of the two connecting blocks 302 is pivotally mounted on a respective one of the locking blocks 400 and has a first end formed with two ears 303 pivotally mounted on the ear 401 of the respective locking block 400. Each of the two temples 300 is mounted on a respective one of the connecting blocks 302 and has an end 301 inserted into the respective connecting block 302.

In operation, when each of the two temples 300 is pivoted relative to the rim 100, each of the two locking blocks 400 is pivoted relative to the respective connecting seat 200 about the pin 204, so that the stub 402 is moved to be locked in one of the locking grooves 202, so as to adjust the angle between each of the two temples 300 and the rim 100.

However, it is necessary to align the pivot hole 403 with the through hole 203 and to insert the pin 204 into the through hole 203 and the pivot hole 403, thereby causing inconvenience in assembly of the glasses. In addition, the glasses are formed by many parts, so that the glasses have a complicated construction, thereby increasing costs of fabrication. Further, the stub 402 is locked in the locking groove 202 in an oblique manner as shown in FIG. 7, so that the stub 402 is easily detached from the locking groove 202, so that the angle between the temples 300 and the rim 100 cannot be adjusted exactly and precisely.

SUMMARY OF THE INVENTION

The primary objective of the present invention is to provide a pair of glasses having an angle adjustable function.

Another objective of the present invention is to provide a pair of glasses, wherein the rim, the pivot blocks, the connecting blocks and the temples are assembled easily and conveniently to form the glasses, thereby facilitating the manufacturer assembling the glasses, and thereby enhancing the working efficiency.

A further objective of the present invention is to provide a pair of glasses, wherein the rim, the pivot blocks, the connecting blocks and the temples are worked easily and conveniently, thereby decreasing costs of fabrication.

A further objective of the present invention is to provide a pair of glasses, wherein the locking pawls of each of the two pivot blocks and the locking teeth of each of the two connecting blocks are arranged in a sector shape, so that the locking pawls are engaged with the locking teeth exactly, so as to adjust the angle between each of the two temples and the rim exactly and precisely.

In accordance with the present invention, there is provided a pair of glasses, comprising a rim, two pivot blocks, two connecting blocks, and: two temples, wherein:

the rim has two ends;

each of the two pivot blocks is pivotally mounted on the rim and has a first end pivotally mounted on the respective end of the rim and a second end formed with an opening having a first side formed with two flexible locking pawls;

each of the two connecting blocks is pivotally mounted on a respective one of the two pivot blocks and has a first end pivotally mounted in the opening of the respective pivot block and a second end protruding outward from the respective pivot block;

each of the two connecting blocks has a first side formed with a plurality of flexible locking teeth engaged with the locking pawls of the respective pivot block; and each of the two temples is mounted on a respective one of the connecting blocks.

Further benefits and advantages of the present invention will become apparent after a careful reading of the detailed description with appropriate reference to the accompanying drawings.

DETAILED DESCRIPTION OF THE INVENTION

Figure 1:
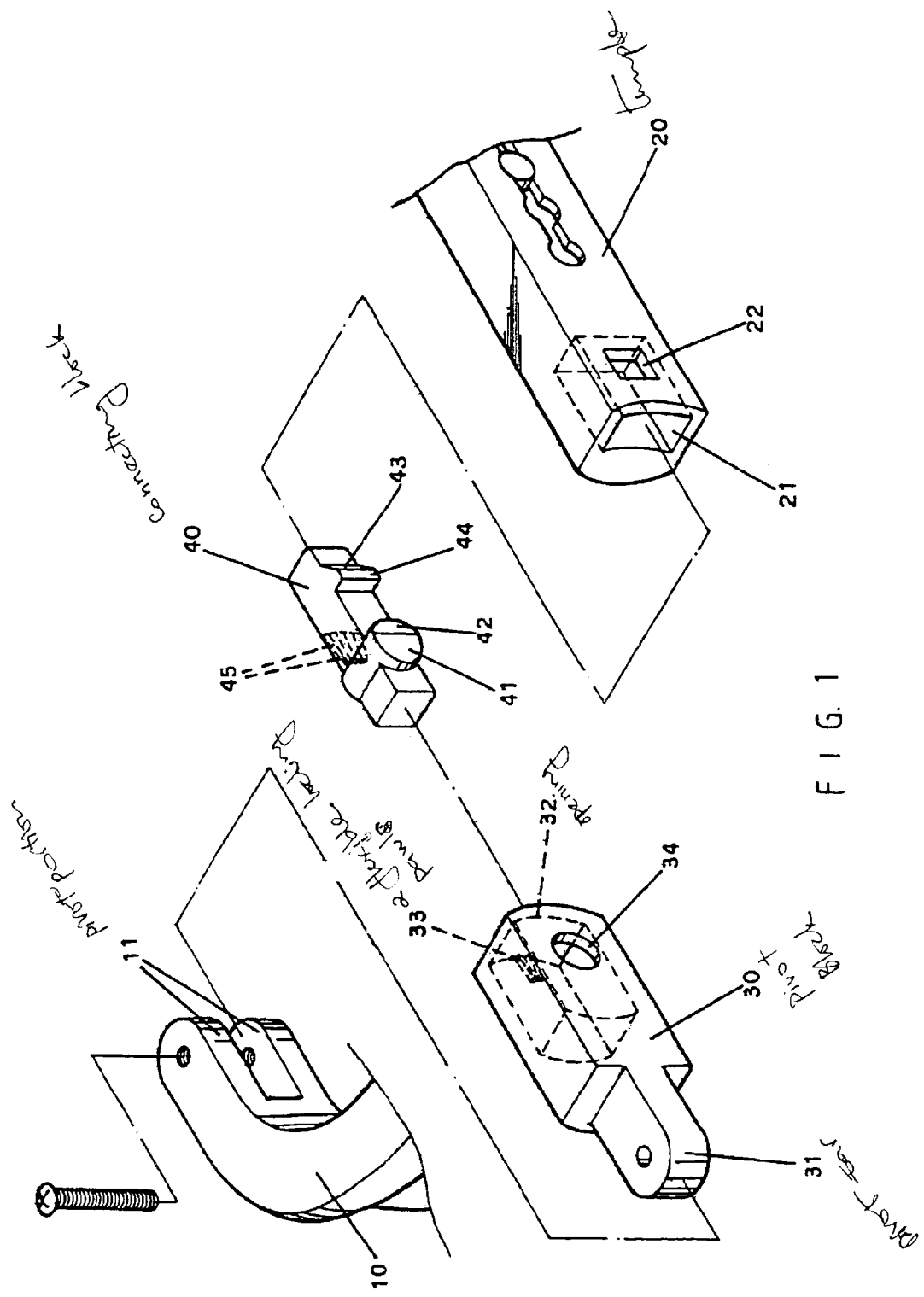
FIG. 1 is an exploded perspective view of a pair of glasses in accordance with the preferred embodiment of the present invention.

Referring to the drawings and initially to FIGS. 1–4, a pair of glasses in accordance with the preferred embodiment of the present invention comprises a rim 10, two pivot blocks 30, two connecting blocks 40, and two temples 20.

The rim 10 has two ends each formed with a pivot portion 11.

Each of the two pivot blocks 30 is pivotally mounted on the respective end of the rim 10 and has a first end formed with a pivot ear 31 pivotally mounted on the respective pivot portion 11 of the rim 10 and a second end formed with an opening 32. The opening 32 of each of the two pivot blocks 30 has a first side formed with two flexible locking pawls 33 and a second side formed with a through hole 34 communicating with the opening 32. Preferably, the two locking pawls 33 of each of the two pivot blocks 30 are arranged in a sector shape.

Each of the two connecting blocks 40 is pivotally mounted on a respective one of the two pivot blocks 30 and has a first end pivotally mounted in the opening 32 of the respective pivot block 30 and a second end protruding outward from the respective pivot block 30. The first end of each of the two connecting blocks 40 is formed with a tenon 42 pivotally mounted in the through hole 34 of the respective pivot block 30. The tenon 42 is formed with a ramp 41 to facilitate insertion of the tenon 42 into the through hole 34 of the respective pivot block 30. Each of the two connecting blocks 40 has a first side formed with a plurality of flexible locking teeth 45 (see FIG. 2) engaged with the two locking pawls 33 of the respective pivot block 30 and a second side formed with a locking block 44. Preferably, each of the locking pawls 33 of each of the two pivot blocks 30 is locked between two adjacent locking teeth 45 of the respective connecting block 40. Preferably, the locking teeth 45 of each of the two connecting blocks 40 are arranged in a sector shape.

Each of the two temples 20 is mounted on a respective one of the connecting blocks 40 and has an end formed with a mounting recess 21 for mounting the second end of the respective connecting block 40. The mounting recess 21 of each of the two temples 20 has a side formed with a locking slot 22 communicating with the mounting recess 21 for mounting the locking block 44 of the respective connecting block 40. The locking block 44 of each of the two connecting blocks 40 is formed with a ramp 43 to facilitate insertion of the locking block 44 into the locking slot 22 of the respective temple 20.

Figure 3:
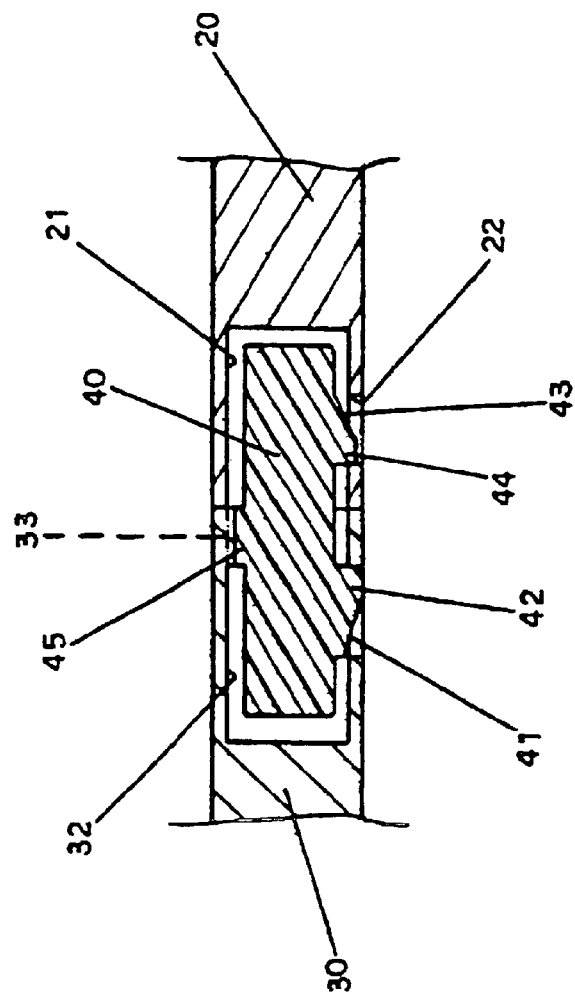
FIG. 3 is a partially cut-away top plan cross-sectional assembly view of the glasses as shown in FIG. 1.
Figure 2:
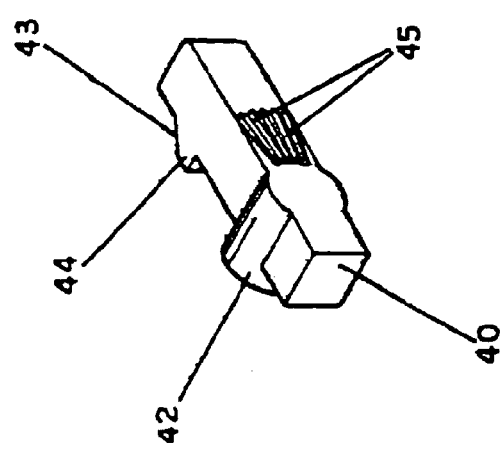
FIG. 2 is a perspective view of a connecting block of the glasses in accordance with the preferred embodiment of the present invention.
Figure 4:
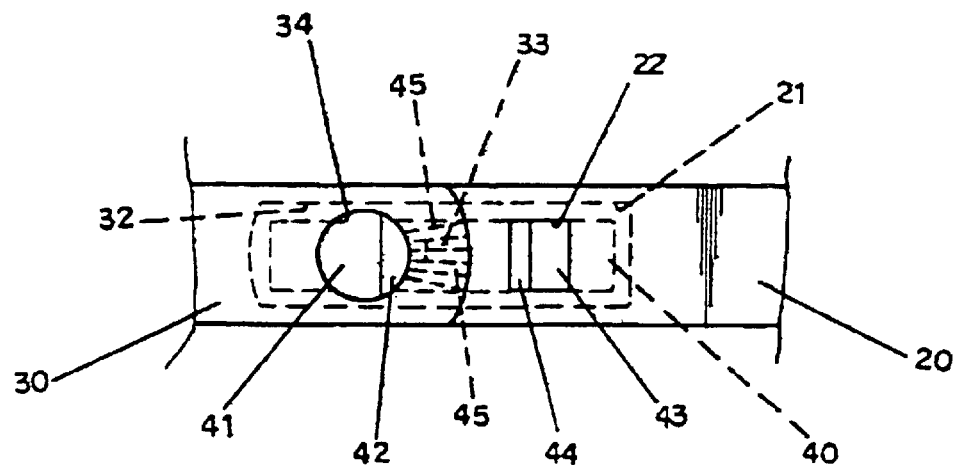
FIG. 4 is a partially cut-away side plan cross-sectional assembly view of the glasses as shown in FIG. 1.
Figure 5:
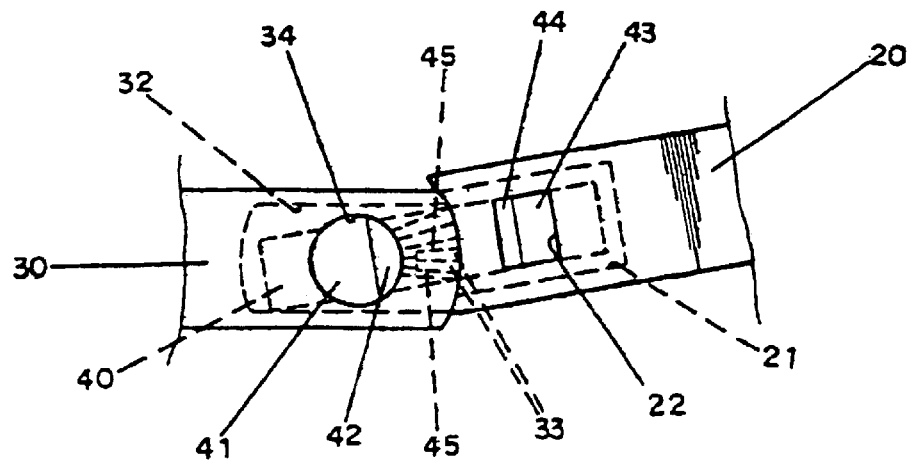
FIG. 5 is a schematic operational view of the glasses as shown in FIG. 4 in adjustment.
Figures 6, 7:
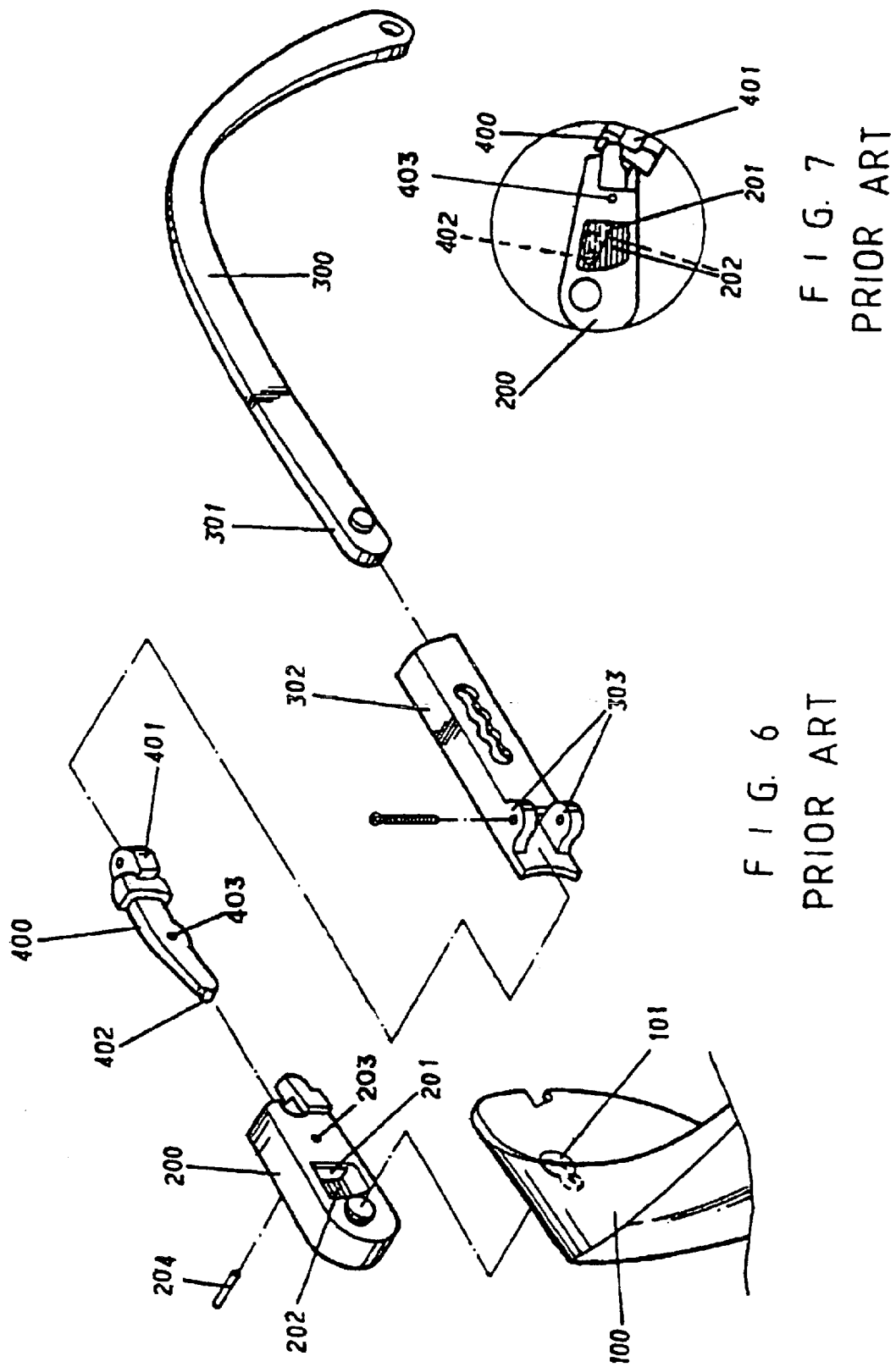
FIG. 6 is an exploded perspective view of a conventional glasses in accordance with the prior art.
FIG. 7 is a partially cut-away side plan cross-sectional assembly view of the conventional glasses as shown in FIG. 6.

In operation, referring to FIGS. 4 and 5 with reference to FIGS. 1–3, when each of the two temples 20 is pivoted relative to the rim 10, each of the two connecting blocks 40 is driven to pivot relative to the respective pivot block 30 about the respective tenon 42, so that the locking teeth 45 of each of the two connecting blocks 40 are moved relative to the locking pawls 33 of the respective pivot block 30. Thus, each of the locking pawls 33 of each of the two pivot blocks 30 is selectively locked between any two adjacent locking teeth 45 of the respective connecting block 40, so that the angle between each of the two connecting blocks 40 and the respective pivot block 30 is adjusted arbitrarily as shown in FIGS. 4 and 5, so as to adjust the angle between each of the two temples 20 and the rim 10.

Accordingly, the rim 10, the pivot blocks 30, the connecting blocks 40 and the temples 20 are assembled easily and conveniently to form the glasses, thereby facilitating the manufacturer assembling the glasses, and thereby enhancing the working efficiency. In addition, the rim 10, the pivot blocks 30, the connecting blocks 40 and the temples 20 are worked easily and conveniently, thereby decreasing costs of fabrication. Further, the locking pawls 33 of each of the two pivot blocks 30 and the locking teeth 45 of each of the two connecting blocks 40 are arranged in a sector shape, so that the locking pawls 33 are engaged with the locking teeth 45 exactly, so as to adjust the angle between each of the two temples 20 and the rim 10 exactly and precisely.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of glasses, comprising a rim, two pivot blocks, two connecting blocks, and two temples, wherein:

the rim has two ends;

each of the two pivot blocks is pivotally mounted on the rim and has a first end pivotally mounted on the respective end of the rim and a second end formed with an opening having a first side formed with two flexible locking pawls;

each of the two connecting blocks is pivotally mounted on a respective one of the two pivot blocks and has a first end pivotally mounted in the opening of the respective pivot block and a second end protruding outward from the respective pivot block;

each of the two connecting blocks has a first side formed with a plurality of flexible locking teeth engaged with the locking pawls of the respective pivot block;

each of the two temples is detachably mounted on a respective one of the connecting blocks;

each of the two connecting blocks has a second side formed with a locking block, each of the two temples has an end formed with a mounting recess for mounting the second end of the respective connecting block;

the mounting recess of each of the two temples has a side formed with a locking slot communicating with the mounting recess for mounting the locking block of the respective connecting block.

2. The glasses in accordance with claim 1, wherein the two locking pawls of each of the two pivot blocks are arranged in a sector shape and each of the locking pawls of each of the two pivot blocks has an elongated shape.

3. The glasses in accordance with claim 1, wherein the opening of each of the two pivot blocks has a second side formed with a through hole communicating with the opening, and the first end of each of the two connecting blocks is formed with a tenon pivotally mounted in the through hole of the respective pivot block.

4. The glasses in accordance with claim 3, wherein the tenon is formed with a ramp to facilitate insertion of the tenon into the through hole of the respective pivot block.

5. The glasses in accordance with claim 1, wherein each of the locking pawls of each of the two pivot blocks is locked between two adjacent locking teeth of the respective connecting block.

6. The glasses in accordance with claim 1, wherein the locking teeth of each of the two connecting blocks are arranged in a sector shape and each of the locking teeth of each of the two connecting blocks has an elongated shape.

7. The glasses in accordance with claim 1, wherein the locking block of each of the two connecting blocks is formed with a ramp to facilitate insertion of the locking block into the locking slot of the respective temple.

8. The glasses in accordance with claim 1, wherein each of the two end of the rim is formed with a pivot portion, and the first end of each of the two pivot blocks is formed with a pivot ear pivotally mounted on the respective pivot portion of the rim.

* * * * *